Oct. 12, 1965     C. D. ROACH ETAL     3,211,019
PUSH-PULL REMOTE CONTROL DEVICE
Filed May 20, 1963
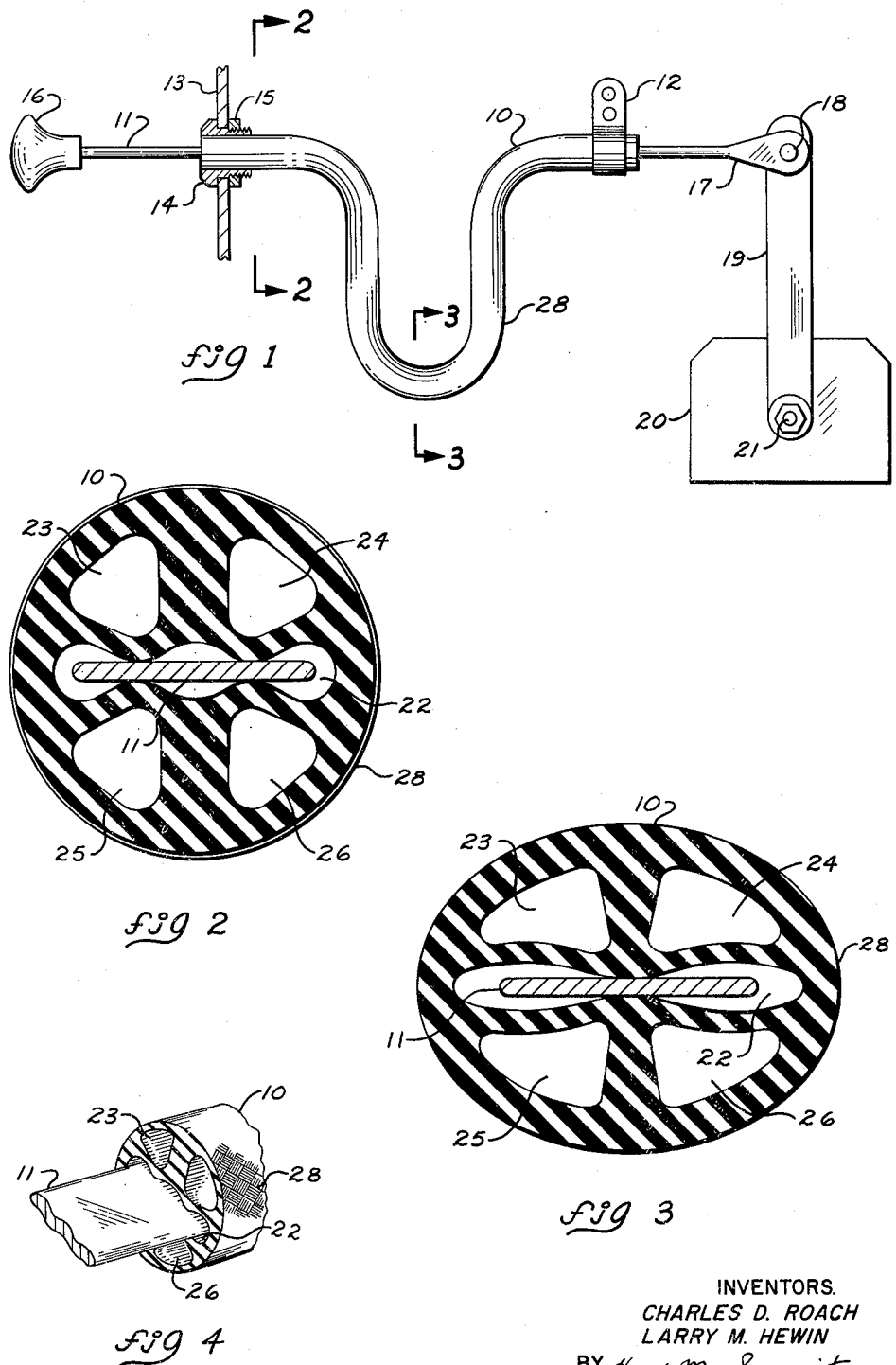
INVENTORS.
CHARLES D. ROACH
LARRY M. HEWIN
BY Harry M. Saragovitz,
Edward J. Kelly,
Herbert Berl &
James W. Colvin United States Patent Office 3,211,019
Patented Oct. 12, 1965

3,211,019
PUSH-PULL REMOTE CONTROL DEVICE
Charles D. Roach, Frankfurt, Germany, and Larry M. Hewin, Newport News, Va., assignors to the United States of America as represented by the Secretary of the Army
Filed May 20, 1963, Ser. No. 281,845
4 Claims. (Cl. 74—501)

(Granted under Title 35, U.S. Code (1952), sec. 266)

The invention herein described and claimed may be manufactured and used by or for the Government for governmental purposes without the payment to us of any royalty thereon.

This invention relates to improvements in flexible control cables such as are known as push-pull control cables or devices and are usually manually operated. Such cables are used for controlling engine throttle and choke valves, ventilator varies or louvers, electric switches, fluid valves, and many other forms of movable control devices. The flexible push-pull cable is used to extend between a control station and a remotely located control apparatus or device where the distance between the control station and the device is such that a simple, rigid control rod or link would be unduly heavy and expensive because of its length, or because the related position of the control station and the control apparatus are such as to preclude the use of a straight control link, or there are intervening components which the control cable must pass around.

Previous devices of this character have been subject to various defects and difficulties, among which are the necessity for keeping the slidable wire or core well lubricated, rigidly securing the ends of the sheath in position, and avoiding bends sharper than a uniform curve of large radius. Such previous devices have usually been made of metal and have a tendency to rust or corrode and have also had variable frictional resistance to sliding movements of the core wire in the sheath depending upon the number and sharpness of the bends to which the cables are subjected.

It is among the objects of the present invention to provide a remote control push-pull cable that is formed of rust and corrosion resistant materials, that does not require lubrication, that is of extremely light weight per unit of length, and will transmit a large force in proportion to its cross-sectional dimensions.

A further object resides in the provision of an improved push-pull cable which can be bent sharply around obstructions and yet will maintain a substantially constant frictional resistance to sliding movements of the core in the sheath regardless of the number or sharpness of the bends to which the cable is subjected.

A still further object resides in the provision of an improved push-pull cable in which the frictional resistance to the movement of the core in the sheath is lower than in previous devices for the same purpose.

Other objects and advantages will become apparent from a consideration of the following description and the appended claims in conjunction with the accompanying drawing wherein:

FIG. 1 is a longitudinal, elevational view of a control cable illustrative of the invention;

FIG. 2 is a cross-sectional view on an enlarged scale substantially on a plane indicated by the line 2—2 on FIG. 1;

FIG. 3 is a cross-sectional view on an enlarged scale substantially on a plane indicated by the line 3—3 on FIG. 2; and FIG. 4 is a fragmentary perspective view of the cable showing a woven armored covering on the outside of the cable sheath.

With continued reference to the drawing, the push-pull cable comprises a sheath 10 of elongated, cylindrical shape formed of a flexible, synthetic material, such as Nylon, and a core member or tape 11 extending longitudinally through the sheath and beyond the ends thereof. The sheath is rigidly secured at its ends to fixed structures, a clamp bracket 12 being shown as secured around one end of the sheath and having screw apertures for attaching the bracket to a fixed part of a machine. The other end of the sheath may be secured to a fixed dashboard, instrument panel, or fire wall 13 by means of a threaded and headed ferrule 14 which receives the corresponding end portion of the sheath and is secured thereto, and a nut 15 threaded onto the ferrule 14. As illustrated, the ferrule 14 extends through an aperture in the fire wall 13 with the head of the ferrule bearing against one side of the fire wall and the nut 15 threaded onto the ferrule and bearing against the oppoiste side of the fire wall to rigidly secure this end of the sheath to the fire wall.

A hand knob 16 is rigidly secured on the end of the core 11 adjacent to ferrule 14 and the opposite end of the core is provided with an eye formation 17 which is pivotally secured by a suitable pin or screw 18 to a lever 19 which operates a control device 20. As illustrated, the formation 17 is secured to the lever 19 near one end of the lever and the lever is connected at its opposite end to an operating shaft 21, or similar element.

While the core 11 could probably be made of a suitable synthetic material, it is preferred to form this element of a relatively hard, resilient material, such as stainless steel. It will be noted that this core or tape has a flattened cross-sectional shape having, in the form illustrated, a width of approximately ten times its thickness. The ratio of the width to the thickness of the core tape may vary, however, for different uses of the control cable and for different installations.

As shown in FIG. 1, the sheath 10 is provided with a plurality of bores, five being illustrated, extending longitudinally through the sheath from one end to the other. There is a central bore 22, which is extended in width along a diameter of the transverse cross-section of the sheath, to receive the core tape 11, this bore extending somewhat beyond the opposite edges of the tape. The central bore is provided with rounded enlargements, one at each side edge of the bore and one along the longitudinal center line, the mutually opposed portions between the central enlargement and the edge enlargements being spaced so as to bear on the correspondingly oppoiste side surfaces of the tape 11 to frictionally hold the tape in position in the sheath.

In addition to the central bore 22 there are four radially disposed bores 23, 24, 25, and 26, spaced apart and spaced from the central bore and arranged symmetrically around the longitudinal center line of the sheath and symmetrically at opposite sides of the central bore. It will be noted, for example, that there is a curved wall between the material forming the restricted portion of the central bore 22, which bears on the side of the tape nearest the radial bore 23 and the adjacent portion of this radial bore, which curved wall has a designated amount of flexibility or resiliency for a purpose which will presently appear. There are similar curved, flexible walls between the bores 24, 25, and 26 and the corresponding side surfaces of the tape 11.

When the cable is bent, the cross-sectional shape of the sheath 10 changes from the substantially circular shape shown in FIG. 2 to the approximately elliptical shape shown in FIG. 3, the degree of change depending upon the sharpness of the bend. As shown in FIG. 3, the outline of the sheath has changed from the circular form shown in FIG. 2 to an elliptical form and the bores 23, 24, 25, and 26 have become flattened. The shape of the central bore 22 has also changed so that it now comprises enlarged end portions of elongated shape and a restricted central portion. The surfaces of the restricted central portion bear on the longitudinally central portion of the tape 11 at the inner ends of the wall portions of the sheath between the bores 23 and 24 and between the bores 25 and 26. Under these conditions, although the pressure of the portions of the surface of the central bore 22 bearing on the tape may have been increased by bending the sheath, the frictional resistance to movement of the tape through the sheath remains constant because the area of the surface of the central bore in contact with the tape has been proportionately decreased.

The core tape 10, being flat or thin, will bend readily in the direction of its thickness and is sufficiently flexible that the change in curvature occasioned by moving this tape through the bent sheath does not cause any material resistance.

The sheath being formed of a synthetic material, such as Nylon, and the core tape being formed of a material such as stainless steel, there is little or no tendency for the cable to rust or corrode, and since a synthetic material, such as Nylon, provides an excellent bearing surface, there is no necessity for lubricating the core tape. The ends of the sheath can be rigidly secured in position because it is quite easy to permanently bond securing elements such as the bracket 12 and ferrule 14 to the synthetic material and, because of the width of the tape, the strength of the material of the sheath and the manner in which the sheath holds the tape in position, a large force can be transmitted along the tape in proportion to the cross-sectional dimensions of the cable. The frictional resistance to movement of the core tape through the sheath is maintained substantially constant by reason of the changing cross-sectional shape of the sheath when the sheath is bent, the resultant of the surface area of the sheath in contact with the tape multiplied by the pressure exerted between the contact surfaces and the tape being maintained at a substantially constant value. Also, because of the low frictional resistance between the material of the tape and the material of the sheath, the frictional resistance to movement of the tape through the sheath will always be small.

While the Nylon sheath would be satisfactory in many installations without an armored covering, in some installations where the sheath might be subjected to excessive wear or where it may be desirable for other reasons the sheath may be covered with a wrapped, braided, or woven outer covering 28 for protecting the cable and for maintaining the cross-sectional area of the cable at the same circumferential dimensions when the cable changes from its circular to its elliptical cross-sectional shape, as described above.

While a specific embodiment of the invention has been hereinabove described and illustrated in the accompanying drawing, it is to be understood that the scope of the invention is not limited by this description and illustration, but is commensurate with the scope of the appended claims.

We claim:

1. A flexible control cable comprising an elongated sheath of synthetic material, such as Nylon, having a centrally located bore and a plurality of radially located bores extending therethrough in spaced apart relationship to each other, and a core tape of resilient material and of flat cross-sectional shape extending through said centrally located bore and slidable therein, said bores being so dimensioned, shaped, and arranged that when the cable is bent the shape of said centrally located bore is changed in a manner to maintain substantially constant the frictional resistance to movement of said tape relative to said sheath.

2. A flexible control cable comprising an elongated sheath of synthetic material, such as Nylon, having a central bore and a plurality of radially located bores extending therethrough in spaced apart relationship to each other, and a core tape of resilient material and of flat cross-sectional shape extending through said central bore and slidable therein, said central bore being shaped to provide restricted longitudinally extending surface areas in contact with the opposite sides of said tape to minimize the frictional resistance of movement of said tape relative to said sheath while maintaining said tape firmly in position in said central bore.

3. A flexible control cable comprising an elongated sheath of synthetic material, such as Nylon, having a central bore and a plurality of radially arranged bores extending longitudinally therethrough in spaced apart relationship to each other, and a resilient metallic tape of flattened cross-sectional shape extending through said central bore and longitudinally movable therein, said radially arranged bores being somewhat sector-shaped in cross-section and said central bore being extended in width along a diameter of a cross-section of said sheath and having symmetrically arranged enlargements to restrict the surface areas of said central bore in contact with the opposite sides of said tape, said radially arranged bores being symmetrically disposed at opposite sides of said central bore and said bores providing for a change in the cross-sectional shape of said sheath from a circular shape when said cable is straight to an elliptical shape when said cable is bent.

4. A flexible control cable comprising an elongated sheath of synthetic material, such as Nylon, having a central bore and a plurality of radially arranged bores extending longitudinally therethrough in spaced apart relationship to each other, and a resilient metallic tape of flattened cross-sectional shape extending through said central bore and longitudinally movable therein, said radially arranged bores being somewhat sector-shaped in cross-section and said central bore being extended in width along a diameter of a cross-section of said sheath and having symmetrically arranged enlargements to restrict the surface areas of said central bore in contact with the opposite sides of said tape, said radially arranged bores being symmetrically disposed at opposite sides of said central bore and said bores providing for a change in the cross-sectional shape of said sheath from a circular shape when said cable is straight to an elliptical shape when said cable is bent and for a change in the cross-sectional shape of said central bore whereby the resultant of the surface area of said central bore in contact with said tape multiplied by the pressure exerted between said surface area and said tape is maintained at a substantially constant value.

References Cited by the Examiner

UNITED STATES PATENTS

| | | | |
|---|---|---|---|
| 504,397 | 9/63 | Marsh | 138—118 X |
| 2,340,926 | 2/44 | Bradley | 138—118 X |
| 2,787,917 | 4/57 | Schroeder | 74—502 |
| 2,801,530 | 8/57 | Holt | 64—3 |
| 2,905,178 | 9/59 | Hilzinger | 74—502 |
| 2,998,028 | 8/61 | Rohde | 138—118 X |

MILTON KAUFMAN, *Primary Examiner.*

BROUGHTON G. DURHAM, *Examiner.*